(12) United States Patent
Ahmed et al.

(10) Patent No.: US 12,486,169 B1
(45) Date of Patent: Dec. 2, 2025

(54) CaB2O4/PbO/CuO/Pb3O4/PbB2O4/Pb4O(BO3)2 NANOCOMPOSITE MATERIAL AND METHOD OF MAKING

(71) Applicant: IMAM MOHAMMAD IBN SAUD ISLAMIC UNIVERSITY, Riyadh (SA)

(72) Inventors: Ehab Abdelhamed Abdelrahman Ahmed, Riyadh (SA); Faisal Khuwayshan Lafi Algethami, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/037,087

(22) Filed: Jan. 25, 2025

(51) Int. Cl.
   *C01B 13/32* (2006.01)
(52) U.S. Cl.
   CPC .......... *C01B 13/32* (2013.01); *C01P 2002/60* (2013.01); *C01P 2002/72* (2013.01); *C01P 2002/85* (2013.01); *C01P 2004/03* (2013.01); *C01P 2004/30* (2013.01); *C01P 2004/51* (2013.01); *C01P 2004/61* (2013.01)
(58) Field of Classification Search
   None
   See application file for complete search history.

(56) References Cited

U.S. PATENT DOCUMENTS

| | | | |
|---|---|---|---|
| 5,147,848 A | * | 9/1992 | Chang ............ H10N 60/0772 |
| | | | 505/738 |
| 5,389,603 A | * | 2/1995 | Batlogg ............ H10N 60/857 |
| | | | 505/121 |
| 2010/0159246 A1 | * | 6/2010 | Sakai ................ C09K 3/1409 |
| | | | 977/775 |

FOREIGN PATENT DOCUMENTS

| | | |
|---|---|---|
| CN | 101734929 B | 9/2012 |
| IN | 202211059947 A | 12/2022 |
| IN | 202221073852 A | 6/2024 |

OTHER PUBLICATIONS

Mahdi Ranjeh, et al., "Pechini sol-gel synthesis of Cu2O/Li3BO3 and CuO/Li3BO3 nanocomposites for visible light-driven photocatalytic degradation of dye pollutant". Journal of Alloys and Compounds, vol. 815, Jan. 30, 2020, 152451, 4 pages.

(Continued)

*Primary Examiner* — Guinever S Gregorio
(74) *Attorney, Agent, or Firm* — Oblon, McClelland, Maier & Neustadt, L.L.P.

(57) ABSTRACT

A multiphase particulate nanocomposite material comprising, as determined by X-ray diffraction: a monoclinic CuO crystalline phase; an orthorhombic $CaB_2O_4$ crystalline phase; an orthorhombic PbO crystalline phase; an orthorhombic $Pb_4O(BO_3)_2$ crystalline phase; a tetragonal $Pb_3O_4$ crystalline phase, and, a $PbB_2O_4$ crystalline phase. The multiphase particulate nanocomposite material has, based on the total number of atoms in the nanocomposite material: an atomic concentration of boron (B) is from about 1 to about 10 atom %; an atomic concentration of calcium (Ca) is from about 5 to about 15 atom %; an atomic concentration of copper (Cu) is from about 5 to about 15 atom %; and, an atomic concentration of lead (Pb) is from about 5 to about 15 atom %.

20 Claims, 4 Drawing Sheets

(56) References Cited

OTHER PUBLICATIONS

Mahdi Ranjeh, et al., "Li2MnO3/LiMnBO3/MnFe2O4 ternary nanocomposites: Pechini synthesis, characterization and photocatalytic performance", International Journal of Hydrogen Energy, vol. 45, Issue 41, Aug. 21, 2020, pp. 21241-21251, 4 pages.

* cited by examiner

CaB2O4/PbO/CuO/Pb3O4/PbB2O4/Pb4O(BO3)2 NANOCOMPOSITE MATERIAL AND METHOD OF MAKING

BACKGROUND

Technical Field

The present disclosure is directed to nanocomposite materials, more particularly, to $CaB_2O_4$/PbO/CuO/$Pb_3O_4$/$PbB_2O_4$/$Pb_4O(BO_3)_2$ nanocomposite materials fabricated using Pechini sol-gel method.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The field of nanocomposites has recently seen substantial advancement due to the wide range of applications of nanocomposites in environmental, catalytic, and material sciences. The present disclosure leverages the Pechini sol-gel method to fabricate a nanocomposite containing $CaB_2O_4$, PbO, CuO, $Pb_3O_4$, $PbB_2O_4$, and $Pb_4O(BO_3)_2$, addressing the need for an advanced material that combines the properties of these compounds in a stable and highly functional composite.

Prior studies and patents have focused on enhancing the synthesis methods and properties of multi-component metal oxides, particularly for catalytic and adsorption applications. Traditional approaches often employ methods such as solid-state synthesis and hydrothermal processes to produce composites of individual oxides or binary combinations. However, these methods have limitations, including crystalline phase impurity and limited control over particle size distribution and morphology, all of which are critical for high-performance applications. Previous patents and research articles have highlighted the benefits of using lead-based oxides and borates, as well as calcium and copper oxides, for their catalytic, photocatalytic, and adsorption properties. Despite these advances, existing literature often lacks efficient approaches to combine multiple metal oxides and borates within a single nanocomposite with controlled morphology and high structural diversity.

Accordingly, an object of the present disclosure is directed to the fabrication of a nanocomposite material containing $CaB_2O_4$, PbO, CuO, $Pb_3O_4$, $PbB_2O_4$, and $Pb_4O(BO_3)_2$ that combines the properties of these compounds in a stable and highly functional composite.

SUMMARY

In an exemplary embodiment, a multiphase particulate nanocomposite material is described. The multiphase particulate nanocomposite material comprises, as determined by X-ray diffraction: a monoclinic CuO crystalline phase; an orthorhombic $CaB_2O_4$ crystalline phase; an orthorhombic PbO crystalline phase; an orthorhombic $Pb_4O(BO_3)_2$ crystalline phase; a tetragonal $Pb_3O_4$ crystalline phase, and, a $PbB_2O_4$ crystalline phase. The multiphase particulate composition has, based on the total number of atoms in the nanocomposite material: an atomic concentration of boron (B) is from about 1 to about 10 atom %; an atomic concentration of calcium (Ca) is from about 5 to about 15 atom %; an atomic concentration of copper (Cu) is from about 5 to about 15 atom %; and, an atomic concentration of lead (Pb) is from about 5 to about 15 atom %.

In some embodiments, the particulate nanocomposite material has a volume average crystallite size, as determined by X-ray diffraction, of about 55 to about 60 nm.

In some embodiments, particulate nanocomposite material has a volume average crystallite size, as determined by X-ray diffraction, of about 56 of about 58 nm.

In some embodiments, the particulate nanocomposite material is in the form of particles having a matrix phase with a rough surface and in which sharp-edged plates are embedded and protrude.

In some embodiments, at least a fraction of the sharp-edged plates have a multilayered structure.

In some embodiments, the sharp edged plates have a median volume particle size (Dv50) of about 5 to about 30 μm, as determined by Scanning Electron Microscopy.

In some embodiments, the sharp edged plates have a Dv90 particle diameter of less than about 50 μm, as determined by Scanning Electron Microscopy.

In some embodiments, the particulate nanocomposite material further includes granular particles having a median volume particle size (Dv50) of about 0.1 to about 10 μm, as determined by Scanning Electron Microscopy.

In some embodiments, a method for preparing the multiphase particulate nanocomposite material is described. The method comprises: forming an aqueous mixture by adding an aqueous solution of a chelating agent to an aqueous solution of a calcium salt, a copper salt, a lead salt and boric acid; adding a polyol into the aqueous mixture to form a gel; heating the gel under stirring at a temperature of from about 200 to about 400° C. for a sufficient duration to form a dry powder; and, calcining the dry powder at a temperature of about 500 to about 800° C. to form the nanocomposite material.

In some embodiments, the aqueous solution of the chelating agent is added in a dropwise manner into the aqueous solution of the calcium salt, the copper salt, the lead salt and boric acid.

In some embodiments: the calcium salt is selected from the group consisting of calcium sulfate ($CaSO_4$), calcium nitrate ($Ca(NO_3)_2$), calcium chloride ($CaCl_2$) and calcium acetate ($Ca(CH_3COO)_2$); the copper salt is selected from the group consisting of copper sulfate ($CuSO_4$), copper nitrate ($Cu(NO_3)_2$), copper chloride ($CuCl_2$), and copper acetate ($Cu(CH_3COO)_2$); and, the lead salt is selected from the group consisting of lead sulfate ($PbSO_4$), lead nitrate ($Pb(NO_3)_2$), lead chloride ($PbCl_2$) and lead acetate ($Pb(CH_3COO)_2$).

In some embodiments, the calcium salt is calcium nitrate ($Ca(NO_3)_2$), the cobalt salt is copper nitrate ($Cu(NO_3)_2$), and the lead salt is lead nitrate ($Pb(NO_3)_2$).

In some embodiments, the chelating agent comprises at least one hydroxyalkyl carboxylic acid selected from the group consisting of citric acid, tartaric acid, malic acid, mandelic acid and 12-hydroxystearic acid.

In some embodiments, the chelating agent comprises or consists of tartaric acid.

In some embodiments, the polyol is added in a dropwise manner into the aqueous mixture.

In some embodiments, the polyol has a number average molecular weight of from about 200 to about 5000 g/mol. and an hydroxyl number of from about 25 to about 500 mg KOH/g.

In some embodiments, the polyol is selected from the group consisting of: polyester polyols; polyether polyols; poly(ether-ester) polyols; poly(alkylene carbonate) polyols; and, mixtures thereof.

In some embodiments, the polyol comprises a polyoxy ($C_2$-$C_3$)alkylene polyol.

In some embodiments, the polyol comprises a polyoxy ($C_2$-$C_3$)alkylene polyol having a number average molecular weight of from about 200 to about 5000 g/mol. and an hydroxyl number of from about 25 to about 500 mg KOH/g.

In some embodiments, a method of immobilizing inorganic contaminants disposed in an aqueous medium is described. The method includes contacting the aqueous medium with the multiphase particulate nanocomposite material.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
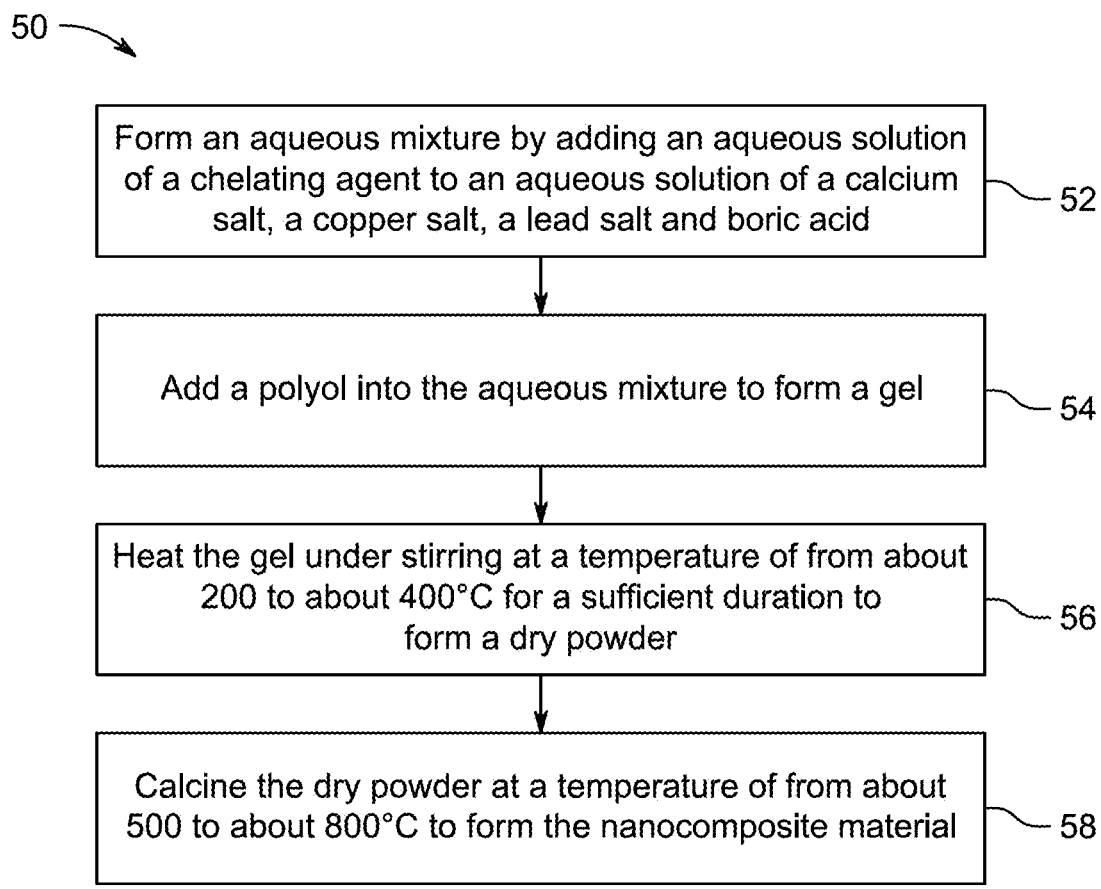
FIG. 1A is a method flowchart for making a $CaB_2O_4$/ $PbO$/$CuO$/$Pb_3O_4$/$PbB_2O_4$/$Pb_4O(BO_3)_2$ nanocomposite material, according to certain embodiments.

Embodiments of the present invention will now be described more fully hereinafter with reference to the accompanying drawings, wherever applicable, in which some, but not all, embodiments of the disclosure are shown.

When describing the present disclosure, the terms used are to be construed in accordance with the following definitions, unless a context dictates otherwise.

As used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

As used herein, the term 'room temperature' refers to a temperature range of 23 degrees Celsius (° C.)±2° C. in the present disclosure. As used herein, 'ambient conditions' means the temperature and pressure of the surroundings in which the substance, composition or article is located.

The temperature parameters in the present application, if not specifically limited, are both allowed to be constant temperature processing and also allowed to be varied within a certain temperature interval. It should be understood that the constant temperature processing allows the temperature to fluctuate within the precision range of the instrument control. It is allowed to fluctuate in the range of, for example, 5° C., 4° C., 3° C., 2° C., or 1° C.

As used herein, the term 'fraction' refers to a numerical quantity which defines a part up to, but not including, 100 percent or the entirety of the thing in question.

As used herein the term 'disposed' refers to being positioned, placed, deposited, arranged or distributed in a particular manner.

As used herein, the term number average molecular weight (Mn) and weight average molecular weight (Mw) are determined by gel permeation chromatography (GPC) with tetrahydrofuran (THF) as the eluent in accordance with DIN 55672-1:2007-08.

As used herein, the term 'X-ray diffraction' or 'XRD' or 'X-ray crystallography' refers to basic technique for obtaining information on the atomic structure of crystalline materials used as a standard laboratory technique. Unless otherwise specified, the XRD shall include an analytical technique based on the diffraction of X-rays by matter, especially for crystalline materials.

As used herein, the term "average crystallite size" refers to the mean size of the crystalline domains or particles within a material. It is typically determined using X-ray diffraction (XRD) analysis, where the broadening of diffraction peaks is related to the size of the crystallites. The average crystallite size provides insight into the degree of crystallinity and the structural characteristics of the material. It is commonly expressed in nanometers (nm) and reflects the typical dimensions of the crystalline regions in the material, excluding any amorphous regions or defects.

As used herein, the term "atomic concentration" refers to the proportion or percentage of a specific element in a material, calculated based on the number of atoms of that element relative to the total number of atoms present in the material. It is typically expressed as a percentage (%) or as an atomic fraction. This measurement may be determined using the exemplary techniques of X-ray fluorescence (XRF), energy-dispersive X-ray spectroscopy (EDX), or inductively coupled plasma mass spectrometry (ICP-MS). Where stated herein, atomic concentration is determined using energy-dispersive X-ray spectroscopy (EDX).

As used herein, the term 'Scanning Electron Microscopy' or 'SEM' refers to a surface-imaging technique that produces images of a sample by scanning the sample with a focused beam of electrons. Unless otherwise specified, the SEM shall include all imaging techniques using electron beams for imaging.

An orthorhombic crystalline phase refers to a crystal structure having three mutually perpendicular axes of unequal lengths (a≠b≠c). This means the crystal lattice forms a rectangular prism where the edges represent the three axes, all intersecting at 90-degree angles ($\alpha=\beta=\gamma=90°$).

A monoclinic crystalline phase refers to a crystal structure in which the unit cell of the material is characterized by three unequal axes, with two of them forming an angle that is not 90°, while the third axis is perpendicular to the plane formed by the other two axes. In other words, the monoclinic crystal system has one axis that is tilted, resulting in a lack of orthogonality between all three axes. The unit cell in the monoclinic phase is thus asymmetrical, with distinct axial lengths and one non −90° angle.

A tetragonal crystalline phase refers to a crystal structure in which the unit cell of the lattice has two axes of equal-length and a third axis that is of different length, but wherein all axes are at right angles (90°) to each other. This crystal system may be represented as a square base (with two equal axes) and a height (the third axis) which is different, resulting in a rectangular prism-like shape. The tetragonal crystal structure possesses a four-fold rotational symmetry around its unique axis.

As used herein, the term 'compound' refers to a chemical entity, regardless of its phase-solid, liquid, or gaseous—as well as its state—crude mixture, purified, or isolated.

As used herein, the term 'particle' refers to a small object that acts as a whole unit with regard to its transport and properties. As used herein, 'nanoparticles'—sometimes contracted herein to NPs—refers to particles having a particle size of 1 nanometer (nm) to 1000 nm.

Unless otherwise stated, the term 'particle size' refers to the largest axis of the particle. In the case of a generally spherical particle, the largest axis is the diameter.

The term 'median volume particle size' (Dv50), as used herein, refers to a particle size corresponding to 50% of the volume of the sampled particles being greater than and 50% of the volume of the sampled particles being smaller than the recited Dv50 value. Similarly, if used, the term 'Dv90' refers to a particle size corresponding to 90% of the volume of the sampled particles being smaller than and 10% of the volume of the sampled particles being greater than the recited Dv90 value. Particle size is determined herein by Scanning Electron Microscopy (SEM).

As used herein, the term 'nanocomposite' refers to a composite material in which at least one dimension of the component is in the nanometer size scale (<100 nm). The nanocomposites are thus poly-phase solid materials made up of two or more nanomaterials. The term includes all types of multiphase solid material in which one of the phases has one, two, or three dimensions of less than 100 nm, or structures having nanoscale repeat distances between the different phases that make up the material. The term "powder", as used herein, means a composition that consists of finely dispersed solid particles that are free-lowing.

The term "dry" as used herein means comprising less than 5 wt. % of any compound or composition being in liquid form when measured at 25° C. under ambient conditions. For instance, the term "dry" includes comprising less than 3 wt. %, less than 2 wt. %, less than 1%, or even about 0% of said compound or composition being in liquid form when measured at 25° C. under ambient conditions. Exemplary such compounds or compositions include water, oils, organic solvents and other wetting agents.

As used herein, '$C_1$-$C_n$ alkyl' group refers to a monovalent group that contains from 1 to n carbons atoms, that is a radical of an alkane and includes straight-chain and branched organic groups. As such, a '$C_1$-$C_4$ alkyl' group refers to a monovalent group that contains from 1 to 4 carbons atoms, that is a radical of an alkane and includes straight-chain and branched organic groups. Examples of alkyl groups include, but are not limited to: methyl; ethyl; propyl; isopropyl; n-butyl; isobutyl; sec-butyl; and, tert-butyl. In the present disclosure, such alkyl groups may be unsubstituted or may be substituted with one or more halogen. Where applicable for a given moiety (R), a tolerance for one or more non-halogen substituents within an alkyl group will be noted in the specification.

The term 'alkylene' refers to a divalent radical derived from an alkyl group as defined above.

The term 'polyoxyalkylene'—alternatively referenced as polyalkylene oxide—refers herein to an aliphatic polyether which is built from repeated —O-A- units, wherein A is alkylene, for instance $C_2$-$C_5$ alkylene. The term 'polyoxy($C_2$-$C_3$)alkylene' encompasses polyoxyethylene, polyoxypropylene and poly(oxyethylene-co-oxypropylene).

The term 'polyol' as used herein shall include diols and higher functionality hydroxyl compounds. The term 'polyether polyol' refers to a compound, which may be linear or branched, that contains at least two ether groups and at least two hydroxyl groups. The term 'polyester polyol' references a polymeric compound, which may be linear or branched, that contains at least two ester linkages and at least two hydroxyl groups. Correspondingly, the term 'poly(ether-ester) polyol' refers to a polyol containing both ether linkages (C—O—C) and ester linkages (R—COO—R) within its structure.

The term 'hydroxyl number' as used herein is defined as the mass in milligrams of potassium hydroxide required to neutralize the acetic acid taken up on acetylation of one gram of a chemical substance that contains free hydroxyl groups. Where stated, the hydroxyl number is determined in accordance with ASTM D4274-11.

The term 'dropwise' as used herein means that one discrete drop or aliquot of a liquid, irrespective of its size or volume, is administered at a time. Discrete drops or aliquots are administered consecutively: they may be provided at regular intervals, at irregular intervals or both such intervals may be applied over the course of administration of the liquid. Further, the volume of an aliquot or drop may be independently determined and thus may be varied over the course of administration of the liquid. Exemplary devices for dropwise addition of liquids include syringes and columns.

As used herein, the term 'Pechini sol-gel method' refers to the synthetic process used to produce metal oxide and composite materials by forming a sol through the polymerization of metal salts in a solvent, typically with the help of a chelating agent and an organic compound such as a polyol. The sol is then converted into a gel by the addition of a gelling agent, and, upon heating, the gel undergoes a transformation into a solid metal oxide or composite material.

The term 'sol' as used herein, refers to a colloidal suspension of solid particles in a continuous liquid medium.

As used herein, the term 'gel' refers to a viscoelastic or semi-solid phase that may form when a sol undergoes a transition to a more structured, three-dimensional network. This transition may occur through polymerization or cross-linking, typically facilitated by the addition of a gelling agent or by partial evaporation of the liquid medium of the sol. The result is a gel in which the liquid phase is entrapped within a solid network, creating a material that is free-standing or self-supporting—in that its yield value is greater than the sheer stress imposed by gravity—but which is still composed of a significant amount of liquid.

In addition, the present disclosure is intended to include all isotopes of atoms occurring in the present compounds and complexes. Isotopes include those atoms having the same atomic number but different mass numbers.

The present disclosure is intended to include all hydration states of a given compound or formula, unless otherwise noted or when heating a material.

Aspects of the present disclosure are directed toward a multiphase particulate nanocomposite material that exhibits enhanced structural and functional properties, increasing the durability of the nanocomposite material. The multiphase particulate nanocomposite material is prepared by a controlled method by incorporating calcium salt, copper salt and lead salts. The resultant nanocomposite stands out for its structural diversity and stability characteristics, enabling its utility in advanced applications, such as in fields requiring materials with complex compositions and robust performance.

A multiphase particulate nanocomposite material is described. The multiphase particulate nanocomposite material comprises: a monoclinic CuO crystalline phase; an orthorhombic $CaB_2O_4$ crystalline phase; an orthorhombic PbO crystalline phase; an orthorhombic $Pb_4O(BO_3)_2$ crystalline phase; a tetragonal $Pb_3O_4$ crystalline phase; and, a $PbB_2O_4$ crystalline phase.

In some embodiments: the monoclinic CuO crystalline phase is pinacoidal or prism shaped; the orthorhombic $CaB_2O_4$ and the orthorhombic PbO crystalline phases are pyramidal, double pyramidal, rhombic pyramidal, or pinacoidal shaped; the tetragonal $Pb_3O_4$ and the tetragonal $Pb_4O(BO_3)_2$ crystalline phases are double- and 8-sided pyramidal, 4-sided prism, pyrite, or trapezohedral in shape.

The particulate nanocomposite material may have a volume average crystallite size, as determined by X-ray diffraction, of from about 55 to about 60 nm, for example from about 56 to about 60 nm, from about 56 to about 58 nm or, in particular, from about 56 to about 57 nm. In certain embodiments, the nanocomposite material has a volume average crystallite size of 56.73 nm.

In some embodiments, the nanocomposite material is in the form of particles having a matrix phase with a rough surface and in which sharp-edged plates are embedded and protrude. The rough surface includes irregularly shaped clusters distributed across the nanocomposite. In some embodiments, the nanocomposite material comprises particles which are granular in morphology. wherein finer granular particles may adhere to the larger plate-like particles or flakes. x. In some embodiments, at least a fraction of the sharp-edged plates has a multilayered structure.

In some embodiments, the sharp-edged plates have a median volume particle size (Dv50) of from about 5 to about 30 μm, as determined by Scanning Electron Microscopy, for example from about 5 to about 25 μm, from about 10 to about 25 μm or from about 15 to about 25 μm.

In some embodiments, the sharp edged plates have a Dv90 particle diameter of less than about 50 μm, as determined by Scanning Electron Microscopy, for example of less than about 45 μm or less than about 40 μm.

In some embodiments, the particulate nanocomposite material further includes granular particles having a median volume particle size (Dv50) of from about 0.1 to about 10 μm, as determined by Scanning Electron Microscopy, for example from 0.1 to about 8 μm or from 0.1 to about 5 μm.

In some embodiments, the atomic concentration of boron (B) in the multiphase particulate nanocomposite material ranges from about 1 to about 10 atom %, for example from about 1 to about 8 atom %, from about 1 to about 6 atom %, from about 1 to about 4 atom %, from about 2 to about 4 atom % or from about 3 to about 4 atom %. In a preferred embodiment, the atomic concentration of boron (B) in the nanocomposite material is 3.7 atom % of the total number of atoms.

In some embodiments, the atomic concentration of lead (Pb) in the multiphase particulate nanocomposite material ranges from about 5 to about 15 atom %, for example from about 5 to about 12 atom %, from about 6 to about 12 atom %, from about 6 to about 10 atom %, from about 7 to about 10 atom %, from about 8 to about 10 atom % or from about 8 to about 9 atom %. In a preferred embodiment, the atomic concentration of lead (Pb) in the nanocomposite material is 8.5 atom % of the total number of atoms.

In some embodiments, the atomic concentration of calcium (Ca) in the multiphase particulate nanocomposite material ranges from about 5 to about 15 atom %, for example from about 7 to about 15 atom %, from about 8 to about 14 atom %, from about 9 to about 14 atom %, from about 10 to about 14 atom %, from about 10 to about 13 atom %, or from about 11 to about 13 atom %. In a preferred embodiment, the atomic concentration of calcium (Ca) in the nanocomposite material is 12.10 atom % of the total number of atoms.

In some embodiments, the atomic concentration of copper (Cu) in the multiphase particulate nanocomposite material ranges from about 5 to about 15 atom %, for example from about 5 to about 12 atom %, from about 6 to about 12 atom %, from about 7 to about 12 atom %, from about 8 to about 12 atom %, from about 9 to about 12 atom % from about 9 to about 11 atom %, or from about 9 to about 10 atom %. In a preferred embodiment, the atomic concentration of copper (Cu) in the nanocomposite material is 9.9 atom % of the total number of atoms.

In some embodiments, the atomic concentration of oxygen (O) in the multiphase particulate nanocomposite material ranges from about 50 to about 80 atom %, for example from about 55 to about 75 atom %, from about 55 to 70 atom % or from about 60 to about 70 atom %. In a preferred embodiment, the atomic concentration of oxygen (O) in the nanocomposite material is 65.8 atom % of the total number of atoms.

FIG. 1A illustrates a flow chart of a method 50 for preparing the multiphase particulate nanocomposite material. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes forming an aqueous mixture by adding an aqueous solution of a chelating agent to an aqueous solution of a calcium salt, a copper salt, a lead salt and boric acid. In certain embodiments, the aqueous solution of the chelating agent is added in a dropwise manner into the aqueous solution of the calcium salt, the copper salt, the lead salt and boric acid.

Exemplary calcium salts having utility in the present method—and which may be used alone or in combination—include, but are not limited to, calcium carbonate ($CaCO_3$), calcium sulfate ($CaSO_4$), calcium chloride ($CaCl_2$)), calcium acetate ($Ca(C_2H_3O_2)_2$), calcium hydroxide ($Ca(OH)_2$), calcium phosphate ($Ca_3(PO_4)_2$), calcium citrate ($Ca_3(C_6H_5O_7)_2$), calcium lactate ($Ca(C_6H_{11}O_7)_2$), calcium formate ($Ca(HCO_2)_2$), calcium oxide (CaO), calcium carbide ($CaC_2$), calcium fluoride ($CaF_2$), calcium pyrophosphate ($Ca_2P_2O_7$), calcium silicate ($CaSiO_3$), calcium metasilicate ($CaSiO_4$), calcium borate ($CaB_4O_7$), calcium chromate ($CaCrO_4$), calcium permanganate ($Ca(MnO_4)_2$), calcium iodide ($CaI_2$), calcium bromide ($CaBr_2$), calcium thiocyanate ($Ca(SCN)_2$), calcium carbonate hydroxide ($CaCO_3 \cdot Ca(OH)_2$), calcium nitrate tetrahydrate ($Ca(NO_3)_2 \cdot 4H_2O$), calcium glucoheptonate ($Ca(C_6H_{11}O_7)_2$), calcium stearate ($Ca(C_{18}H_{35}O_2)_2$), calcium sulfate dihydrate ($CaSO_4 \cdot 2H_2O$), calcium tartrate ($Ca(C_4H_4O_6)$), calcium malate ($Ca(C_4H_4O_5)_2$), and calcium oxalate ($CaC_2O_4$). In some embodiments, the calcium salt may be selected from the group consisting of calcium sulfate ($CaSO_4$), calcium nitrate ($Ca(NO_3)_2$), calcium chloride ($CaCl_2$) and calcium acetate ($Ca(CH_3COO)_2$). In a preferred embodiment, the calcium salt is calcium nitrate ($Ca(NO_3)_2$).

Exemplary lead salts having utility in the present method—and which may be used alone or in combination—include, but are not limited to, lead sulfate ($PbSO_4$), lead chloride ($PbCl_2$), lead acetate ($Pb(CH_3COO)_2$), lead carbonate ($PbCO_3$), lead oxide ($PbO$), lead bromide ($PbBr_2$), lead iodide ($PbI_2$), lead formate ($Pb(HCO_2)_2$), lead phosphate ($Pb_3(PO_4)_2$), lead lactate ($Pb(C_6H_{11}O_7)_2$), lead citrate ($Pb_3(C_6H_5O_7)_2$), lead tartrate ($Pb(C_4H_4O_6)$), lead malate ($Pb(C_4H_4O_5)_2$), lead stearate ($Pb(C_{18}H_{35}O_2)_2$), lead oxalate ($PbC_2O_4$), lead acetate tetrahydrate ($Pb(CH_3COO)_2 \cdot 4H_2O$), lead chloride hexahydrate ($PbCl_2 \cdot 6H_2O$), lead formate tetrahydrate ($Pb(HCO_2)_2 \cdot 4H_2O$), lead aluminate ($PbAl_2O_4$), lead silicate ($PbSiO_3$), lead bromate ($Pb(BrO_3)_2$), lead iodate ($Pb(IO_3)_2$), lead hydroxide ($Pb(OH)_2$), lead sulfide ($PbS$), lead chromate ($PbCrO_4$), lead nitrate hexahydrate ($Pb(NO_3)_2 \cdot 6H_2O$), lead bromide hydrate ($PbBr_2 \cdot H_2O$), lead nitrate tetrahydrate ($Pb(NO_3)_2 \cdot 4H_2O$), and lead ferrite ($PbFe_3O_4$). In some embodiments, the lead salt is selected from the group consisting of lead sulfate ($PbSO_4$), lead nitrate ($Pb(NO_3)_2$), lead chloride ($PbCl_2$) and lead acetate ($Pb(CH_3COO)_2$). In a preferred embodiment, the lead salt is lead nitrate ($Pb(NO_3)_2$).

Exemplary copper salts having utility in the present method—and which may be used alone or in combination—include, but are not limited to, copper carbonate ($CuCO_3$), copper sulfate ($CuSO_4$), copper fluoride ($CuF_2$), copper chloride ($CuCl_2$), copper oxychloride (($CuCl) \cdot [Cu(OH)_2]_3$), copper iodide ($CuI_2$), copper bromide ($CuBr_2$), copper hydroxide ($Cu(OH)_2$), copper borate ($CuB_4O_7$), copper fluoroborate ($Cu_3(PO_4)_2$), copper formate ($Cu(HCO_2)_2$), copper acetate ($Cu(C_2H_3O_2)_2$), copper citrate ($Cu_3(C_6H_5O_7)_2$), copper lactate ($Cu(C_6H_{11}O_7)_2$), copper pyrophosphate ($Cu_2P_2O_7$), copper carbonate hydroxide ($CuCO_3 \cdot Cu(OH)_2$), copper nitrate tetrahydrate ($Cu(NO_3)_2 \cdot 4H_2O$), copper glucoheptonate ($Cu(C_6H_{11}O_7)_2$), copper stearate ($Cu(C_{18}H_{35}O_2)_2$), copper sulfate dihydrate ($CuSO_4 \cdot 2H_2O$), copper tartrate ($Cu(C_4H_4O_6)$), copper malate ($Cu(C_4H_4O_5)_2$), and copper oxalate ($CuC_2O_4$). In some embodiments, the copper salt may be selected from the group consisting of copper sulfate ($CuSO_4$), copper nitrate ($Cu(NO_3)_2$), copper chloride ($CuCl_2$) and copper acetate ($Cu(CH_3COO)_2$). In a preferred embodiment, the copper salt is copper nitrate ($Cu(NO_3)_2$).

In some embodiments: the calcium salt is selected from the group consisting of calcium sulfate ($CaSO_4$), calcium nitrate ($Ca(NO_3)_2$), calcium chloride ($CaCl_2$) and calcium acetate ($Ca(CH_3COO)_2$); the copper salt is selected from the group consisting of copper sulfate ($CuSO_4$), copper nitrate ($Cu(NO_3)_2$), copper chloride ($CuCl_2$) and copper acetate ($Cu(CH_3COO)_2$); and, the lead salt is selected from the group consisting of lead sulfate ($PbSO_4$), lead nitrate ($Pb(NO_3)_2$), lead chloride ($PbCl_2$) and lead acetate ($Pb(CH_3COO)_2$). In some embodiments, the calcium salt is calcium nitrate ($Ca(NO_3)_2$), the cobalt salt is copper nitrate ($Cu(NO_3)_2$), and the lead salt is lead nitrate ($Pb(NO_3)_2$).

In some embodiments, the water of the aqueous solution may be tap water, distilled water, bi-distilled water, deionized water, deionized distilled water, reverse osmosis water or any combination thereof. In a preferred embodiment, the water is distilled water.

In certain embodiments, the molar ratio of Ca:Cu:Pb:B in the aqueous solution, to which the chelating agent is added at Step 52 of the method illustrated in FIG. 1, may be from about (0.8-1.2):(0.8-1.2):(0.8-1.2):(4.0-6.0), for example from about (0.8-1.1):(0.8-1.1):(0.8-1.1):(4.5-5.5).

As used herein, the term 'chelating agent' refers to the chemical compound that can form multiple bonds with a single metal ion, resulting in a stable, ring-like structure known as a chelate complex. The agent has multiple donor atoms (e.g., oxygen, nitrogen, sulfur) that can coordinate with the metal ion, effectively clawing the metal and preventing it from engaging in other chemical reactions. This multidentate binding increases the stability of the metal complex compared to simple, monodentate ligands.

The chelating agent of the present disclosure is typically chosen from aminopolycarboxylic acids, aminophosphonic acids, hydroxyalkyl carboxylic acids and mixtures thereof. Exemplary aminopolycarboxylic acids include: ethylenediamine disuccinic acid; nitrilotriacetic acid; ethylenediaminetetraacetic acid (EDTA); ethylenediaminetetapropionic acid; diethylene triamine pentaacetic acid (DTPA) and triethylenetetraaminehexaacetic acid.

In an important embodiment, the chelating agent comprises at least one hydroxyalkyl carboxylic acid selected from the group consisting of citric acid, tartaric acid, malic acid, mandelic acid and 12-hydroxystearic acid. In a preferred embodiment, the chelating agent comprises or consists of tartaric acid.

When used, the tartaric acid includes natural and commercial forms of the acid. In some embodiments, tartaric acid is D-tartaric acid, L-tartaric acid, achiral tartaric acid or a racemic mixture of D- and L-tartaric acid forms.

The total amount of chelating agent added, optionally in the dropwise manner, at method step 52 of FIG. 1 is at least equimolar and, more typically, in slight molar excess to the total number of moles of calcium, cobalt and lead in the aqueous solution. In certain embodiments, the ratio of the total number of moles of chelating agent to the total number of moles of calcium, copper and lead is from about 1:1 to about 2:1, for example from about 1:1 to about 1.5:1 or from about 1:1 to about 1.3:1.

At step 54, the method 50 includes adding a polyol into the aqueous mixture to form a gel. In some embodiments, the polyol is added in a dropwise manner into the aqueous mixture. The method allows control and amply reaction between the reactants resulting in functional diversity and stability of the nanocomposite material.

Without intention to be bound by theory, the polyol may serve to control the formation of agglomerated particles during the synthesis of the metal oxide nanoparticles through the aqueous sol-gel method. Typically herein, the polyol has: a number average molecular weight of from about 200 to about 5000 g/mol., preferably from about 200 to about 1000 g/mol. and more preferably from 200 to 500 g/mol.; and, a hydroxyl number of from about 25 to about 500 mg, more preferably 200 to 500 mg, and yet more preferably 200 to 300 mg KOH/g.

The polyols having utility in the present disclosure may be monomeric compounds, for instance monomeric aliphatic, cycloaliphatic or aromatic compounds having from 2 to 6 hydroxyl groups per molecule. Exemplary monomeric diols, which may be used alone or in combination include: ethylene glycol; propylene glycol; 1,3-propane diol; 1,2-butane diol; 2-methyl propanediol; 1,3-butane diol; 1,4-butane diol; 2,3-butanediol; neopentyl glycol; hexanediol; decanediol; hexamethylene glycol; cyclohexane dimethanol; polyoxyalkylene glycols, such as diethylene glycol, dipropylene glycol, triethylene glycol, tetraethylene glycol, tripropylene glycol and tetrapropylene glycol; and, aromatic diols such as bisphenol A, bisphenol F, hydrogenated bisphenol A and hydrogenated bisphenol F. Exemplary triols, which may be used alone or in combination include: 1,2,3-propanetriol; 1,2,4-butanetriol; 2-ethyl-2-hydroxymethyl-1,3-propanediol (trimethylolpropane); 3-methyl-1,3,5-pentanetriol; 1,2,3-hexanetriol; 1,2,6-hexanetriol; 2,5-dimethyl-1,2,6-hexanetriol; 1,2,3-heptanetriol; 1,2,3-octanetriol; and, 2-hydroxymethyl-1,3-propanediol. Exemplary tetrols and pentols include: 2,2-bis(hydroxymethyl)propane-1,3-diol (pentaerythritol); pentose; pentopyranose; 6-deoxyhexopyranose; 2,5-anhydrohexitol; 1,5-anhydrohexitol; 6-deoxyhexose; 1-deoxyhexitol; and, pentitol. An exemplary polyol having six hydroxyl groups is D-glucitol (sorbitol).

The present disclosure also provides for the use of polymeric polyols. In an embodiment, the polyol is selected from the group of: polyester polyols; polyether polyols; poly (ether-ester) polyols; poly(alkylene carbonate) polyols; and, mixtures thereof.

Polycarbonate diols having utility herein may be obtained by reacting carbonic acid derivatives with diols. Exemplary carbonic acid derivatives are diaryl carbonates including but not limited to diphenyl carbonate, di($C_1$-$C_6$)alkyl carbonates and phosgene. Exemplary diols include but are not limited to: ethylene glycol; 1,2-propanediol; 1,3-propanediol; 1,3-butanediol; 1,4-butanediol; 1,5-pentanediol; 1,6-hexanediol; cyclohexane dimethanol; diethylene glycol; dipropylene glycol; neopentylglycol; and, mixtures thereof.

Polyester diols having utility herein may be obtained by reacting diols with either aliphatic, aromatic or cycloaliphatic dicarboxylic acids or, in some circumstances, the corresponding anhydrides thereof: the reaction may optionally take place in the presence of an esterification catalyst. Examples of suitable dicarboxylic acids include but are not limited to: adipic acid; glutaric acid; pimelic acid; suberic acid; nonanedicarboxylic acid; decanedicarboxylic acid; succinic acid; maleic acid; sebacic acid; azelaic acid; terephthalic acid; isophthalic acid; o-phthalic acid; tetrahydrophthalic acid; hexahydrophthalic acid; trimellitic acid; and, 1,4-cyclohexanedicarboxylic acid. Examples of suitable anhydrides include succinic, o-phthalic and trimellitic anhydride. It is noted that various commercially available dimeric fatty acids in saturated (hydrogenated) or unsaturated form may also be used as the dicarboxylic acid. And examples of suitable diols for the preparation of the polyester diols are: ethanediol; di-, tri- or tetraethylene glycol; 1,2-propanediol; di-, tri-, tetrapropylene glycol; 1,3-propanediol; 1,4-butanediol; 1,3-butanediol; 2,3-butanediol; 1,6-hexanediol; 1,5-pentanediol; 2,2-dimethyl-1,3-propanediol (neopentylglycol); 1,4-dihydroxycyclohexane; 1,4-dimethylcyclohexane; 1,8-octanediol; 1,10-decanediol; 1,12-decanediol; 2,2,4- and/or 2,4,4-trimethyl-1,3-pentanediol; and, mixtures thereof.

Other useful polyester diols are those obtainable from diol initiated polymerization of hydroxycarboxylic acids containing from 2 to 12 carbon atoms or a lactone thereof. The hydroxycarboxylic acids may be saturated or unsaturated, linear or branched, of which example include: glycolic acid; lactic acid; 5-hydroxy valeric acid; 6-hydroxy caproic acid; ricinoleic acid; 12-hydroxy stearic acid; 12-hydroxydodecanoic acid; 5-hydroxydodecanoic acid; 5-hydroxydecanoic acid; and. 4-hydroxydecanoic acid. Examples of suitable lactones are β-propiolactone, δ-valerolactone, ($C_1$-$C_6$)alkyl-valerolactone, ε-caprolactone and ($C_1$-$C_6$)alkyl-ε-caprolactone.

In an embodiment, the polyol is a polyether polyol. Exemplary polyether polyols may be obtained from the polymerization of a cyclic oxide—such as ethylene oxide, propylene oxide or butylene oxide—or by the addition of one or more such oxides to polyfunctional initiators having at least two active hydrogen atoms, such as water, polyhydric alcohols, polythiols, polyamines and alkanolamines.

In a preferred embodiment, the polyol comprises a polyoxy($C_2$-$C_3$)alkylene polyol having: a number average molecular weight of from about 200 to about 5000 g/mol.; and, an hydroxyl number of from about 25 to about 500 mg KOH/g. For example, the polyol may comprise a polyoxy ($C_2$-$C_3$)alkylene polyol having: a number average molecular weight of from about 200 to about 1000 g/mol. or from about 200 to about 500 g/mol; and, an hydroxyl number of from about 200 to about 500 mg KOH/g. or from about 200 to 300 mg KOH/g. Polyethylene glycol (PEG) 400 may be mentioned as an exemplary polyoxy($C_2$-$C_3$)alkylene polyol.

At step 56, the method 50 includes heating the gel under stirring at a temperature of from about 200 to about 400° C. for a sufficient duration to form a dry powder. In some embodiments, the gel is heated under stirring at a temperature ranging from about 200 to about 350° C., for example from about 200 to about 300° C., from about 210 to about 290° C., from about 220 to about 280° C., from about 230 to about 270° C. or from about 240 to about 260° C. In a preferred embodiment, the gel is heated at 250° C. In some embodiments, the heating can be performed by using heating appliances such as ovens, microwaves, autoclaves, hot plates, heating mantles and tapes, oil baths, salt baths, sand baths, air baths, hot-tube furnaces, and hot-air guns.

At step 58, the method 50 includes calcining the dry powder at a temperature of from about 500 to about 800° C., preferably from about 500 to about 700° C., and more preferably from about 550 to about 650° C. to form the particulate nanocomposite material. The calcination is carried out by heating it to a high temperature, under a restricted supply of ambient oxygen. This is performed to remove impurities or volatile substances and to incur thermal decomposition. Typically, the calcination is carried out in a furnace equipped with a temperature control system, which may provide a heating rate of up to about 50° C./min, for example up to about 40° C./min, up to about 30° C./min, up to about 20° C./min, up to about 10° C./min or up to about 5° C./min. In preferred embodiments, the dry powder is calcined for a duration of from about 2 to about 4 hours, such as from about 2.5 to about 3.5 hours or about 3 hours to form the particulate nanocomposite material.

It is not precluded in the present method, that the particles directly obtained from the calcination step may be subjected to at least one of comminution, homogenization or classification in order to moderate the particle size distribution thereof.

The multiphase particulate nanocomposite material of the present disclosure presents several advantages, in particular an enhanced surface area, which may boost reactivity and efficiency in applications such as catalysis and adsorption. The adsorption capacity of the material may allow for selective surface adsorption or trapping of molecules, making them ideal for applications like water treatment, and pollutant removal.

In some embodiments, a heterogeneous catalyst is provided which includes the multiphase particulate nanocomposite material. A heterogeneous catalyst is a catalyst that exists in a different phase from the reactants in a chemical reaction. Herein, where the catalyst will comprise a particulate solid, the reactants may be gases and/or liquids. The catalytic process involves the reactants adsorbing onto the surface of the solid catalyst, where the reaction takes place, and then desorbing the products after the reaction. The catalyst itself remains chemically unchanged during the reaction. Where there are no substantial deposits on the nanocomposite and the catalyst maintains its structural integrity during the catalyzed reaction, a heterogenous catalyst comprising the particulate nanocomposite may be reused.

A method of immobilizing inorganic contaminants disposed in an aqueous medium is also described. The method includes contacting the aqueous medium with the multiphase particulate nanocomposite material as described hereinabove. This method relies on the adsorption of the inorganic contaminants—of which metal ions dissolved in waste water may be mentioned as important examples—onto the multiphase particulate nanocomposite material.

A method of degrading organic pollutants disposed in an aqueous medium is still further described. The method includes contacting the aqueous medium under actinic irradiation with the multiphase particulate nanocomposite material as described herein.

Exemplary organic pollutants include, but are not limited to: dyes; phenols; polycyclic aromatic hydrocarbons (PAH); organic herbicides; organic pesticides, including organic algicides, fungicides, bactericides, virucides, insecticides and miticides; and, persistent organic pollutants. For completeness, a persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme (UNEP), 2001 Stockholm Convention on Persistent Organic Pollutants.

The methods of immobilizing inorganic contaminants and of photocatalytic degradation of organic pollutants both require an aqueous medium to be brought into contact with the nanocomposite material for a sufficient contact time to permit adsorption of the species concerned. The aqueous medium may be provided as a static volume in which the nanocomposite material is dispersed. In an alternative embodiment, the aqueous medium may be provided as fixed volume in which the nanoparticulate is dispersed but which is subjected to agitation: the nanoparticulate material may be suspended in the volume or may be constrained within a bed or membrane or by a support. In a further non-limiting alternative, the aqueous medium may be provided as a flow which contacts the nanoparticulate material. In this embodiment, the nanoparticulate material may need to constrained within a bed or membrane which the aqueous medium contacts as either a perpendicular or tangential (cross-) flow stream.

The following example is provided solely for illustration and is not to be construed as a limitation of the present disclosure, as many variations thereof are possible without departing from the spirit and scope of the present disclosure.

EXAMPLE

The following example provides a $CaB_2O_4/PbO/CuO/Pb_3O_4/PbB_2O_4/Pb_4O(BO_3)_2$ nanocomposite material.

Figure 1B:
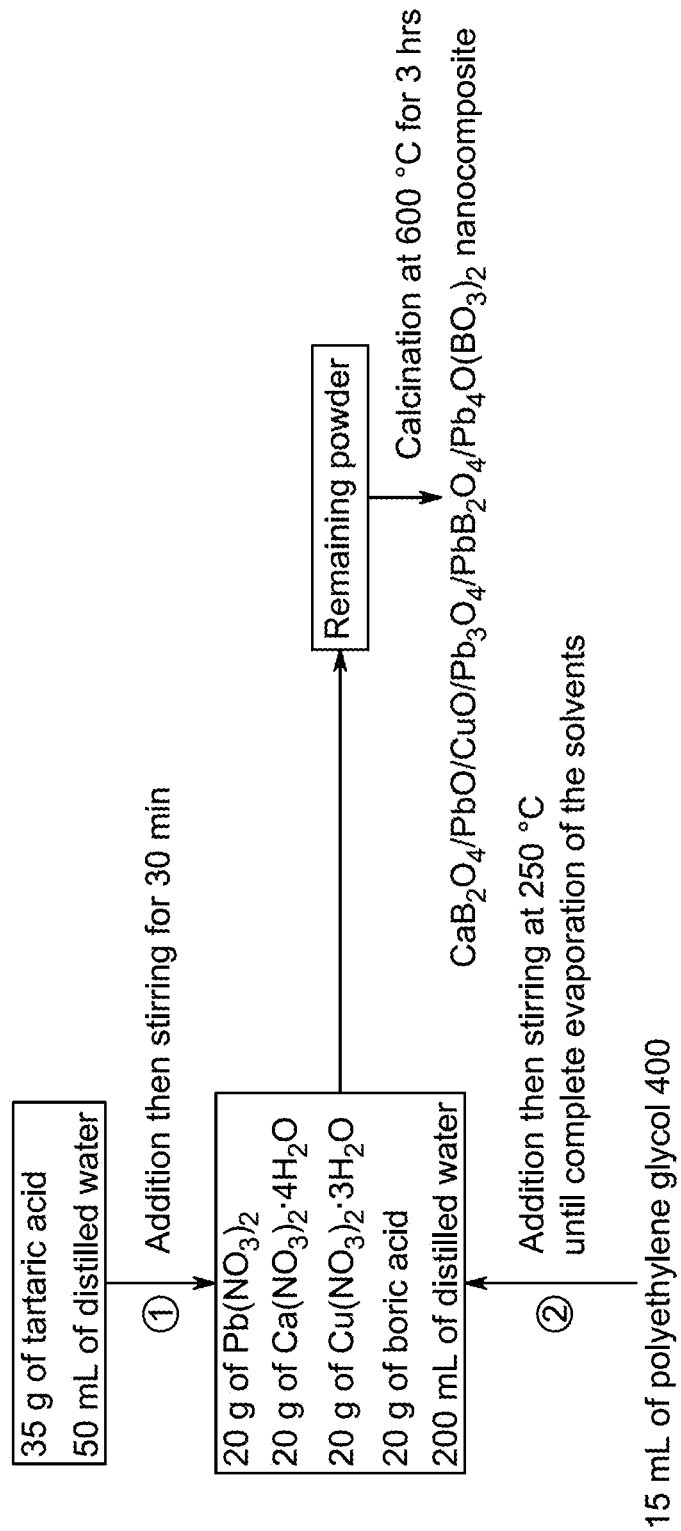
FIG. 1B shows experimental steps for the production of the nanocomposite material, according to certain embodiments.

Example 1: Synthesis of $CaB_2O_4/PbO/CuO/Pb_3O_4/PbB_2O_4/Pb_4O(BO_3)_2$ Nanocomposite Using Pechini Sol-Gel Method The $CaB_2O_4/PbO/CuO/Pb_3O_4/PbB_2O_4/Pb_4O(BO_3)_2$ nanocomposite was synthesized through the Pechini sol-gel method in a series of controlled steps as shown in FIG. 1B. Initially, 35 g of tartaric acid was dissolved in 50 mL of distilled water to form an organic complexing solution. Separately, 20 g of lead(II) nitrate ($Pb(NO_3)_2$), 20 g of calcium nitrate tetrahydrate ($Ca(NO_3)_2 \cdot 4H_2O$), 20 g of copper(II) nitrate trihydrate ($Cu(NO_3)_2 \cdot 3H_2O$), and 20 g of boric acid were dissolved in 200 mL of distilled water to create a mixed metal nitrate solution. The tartaric acid solution was then added to the mixed metal nitrate solution with continuous stirring for 30 min. Subsequently, 15 mL of polyethylene glycol 400 was added to the mixture as a gelation agent. This mixture was then heated to 250° C. with continuous stirring until complete evaporation of the solvents, resulting in dry precursor powder. Finally, the remaining powder was calcined at 600° C. for 3 hours to yield the $CaB_2O_4/PbO/CuO/Pb_3O_4/PbB_2O_4/Pb_4O(BO_3)_2$ nanocomposite.

RESULTS AND DISCUSSION

Figure 2:
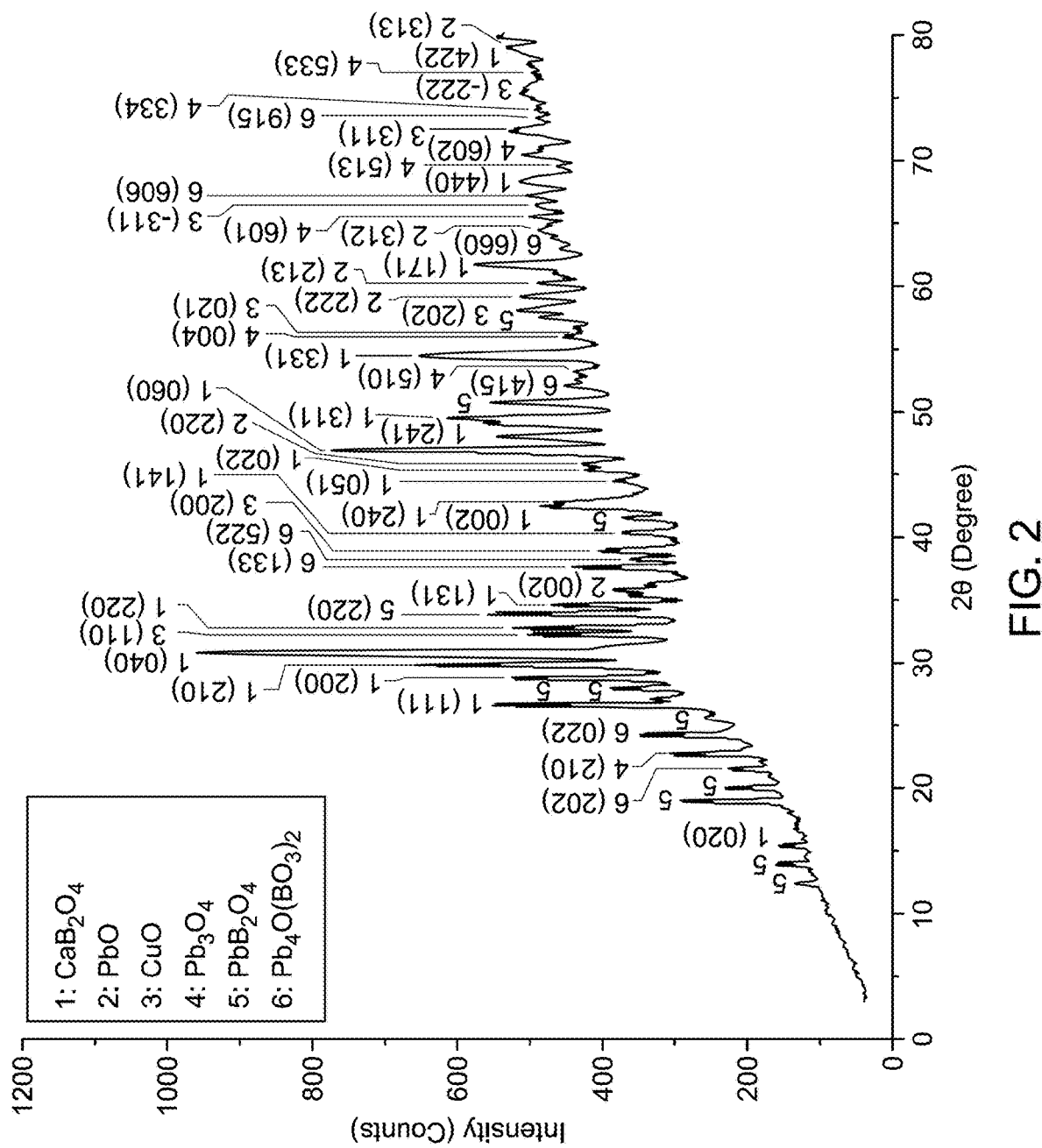
FIG. 2 shows a X-ray diffractogram (XRD) of the nanocomposite material, according to certain embodiments.

FIG. 2 shows the X-ray diffraction (XRD) patterns of the $CaB_2O_4/PbO/CuO/Pb_3O_4/PbB_2O_4/Pb_4O(BO_3)_2$ nanocomposite, which consists of several phases including: calcium borate ($CaB_2O_4$) with an orthorhombic crystal system in accordance with International Centre for Diffraction Data (ICDD) entry JCPDS No. 00-022-0522, the disclosure of which is incorporated herein in its entirety; lead(II) oxide (PbO) with an orthorhombic crystal system in accordance with International Centre for Diffraction Data (ICDD) entry JCPDS No. 00-035-1482, the disclosure of which is incorporated herein in its entirety; copper(II) oxide (CuO) with a monoclinic crystal system in accordance with International Centre for Diffraction Data (ICDD) entry JCPDS No. 01-073-6023), the disclosure of which is incorporated herein in its entirety; lead tetroxide ($Pb_3O_4$) with a tetragonal crystal system in accordance with International Centre for Diffraction Data (ICDD) entry JCPDS No. 01-073-6505, the disclosure of which is incorporated herein in its entirety; lead borate ($PbB_2O_4$) in accordance with International Centre for Diffraction Data (ICDD) entry JCPDS No. 00-020-0575, the disclosure of which is incorporated herein in its entirety; and, lead oxide borate ($Pb_4O(BO_3)_2$) with an orthorhombic crystal system in accordance with International Centre for Diffraction Data (ICDD) entry JCPDS No. 01-080-6096, the disclosure of which is incorporated herein in its entirety. $CaB_2O_4$ exhibits 2θ angles at 15.32, 26.54, 28.64, 29.80, 30.73, 32.74, 34.51, 40.29, 42.39, 42.69, 44.38, 45.33, 46.89, 47.95, 49.32, 54.46, 61.69, 68.31, and 77.54 with corresponding Miller indices (020), (111), (200), (210), (040), (220), (131), (141), (002), (240), (051), (022), (060), (241), (311), (331), (171), (440), and (422). PbO is observed with 2θ angles of 35.68, 45.75, 59.17, 60.23, 64.31, and 78.79 corresponding to Miller indices (002), (220), (222), (113), (312), and (313). CuO has 2θ values at 32.21, 38.92, 56.65, 58.13, 66.32, 72.30, and 75.33 with Miller indices (110), (200), (021), (202), (−311), (311), and (−222), respectively. For $Pb_3O_4$, the 2θ values are 22.65, 53.09, 56.03, 65.48, 69.46, 70.41, 73.98, and 76.81 with Miller indices (210), (510), (004), (601), (513), (602), (334), and (533), respectively. The 2θ angles observed for $PbB_2O_4$ are 12.37, 13.95, 18.88, 19.83, 25.50, 26.96, 27.78, 33.89, 41.44, 50.67, and 57.49. Lastly, $Pb_4O(BO_3)_2$ has 2θ values at 21.39, 24.13, 37.56, 38.19, 52.04, 62.96, 67.05, and 73.23 with Miller indices (202), (022), (133), (522), (415), (660), (606), and (915), respectively. The synthesized nanocomposite has an average crystallite size of 56.73 nm.

Figure 3:
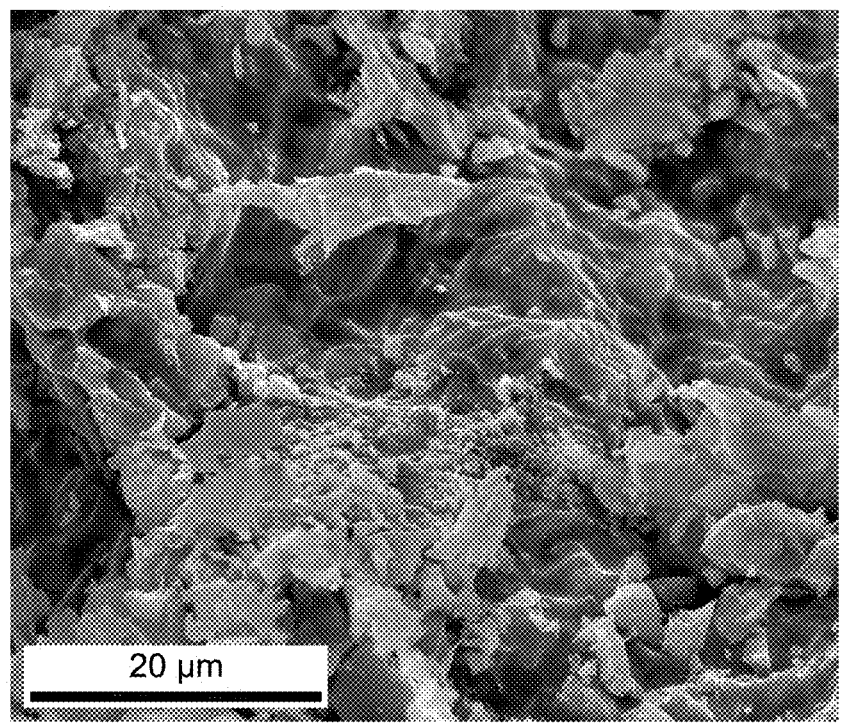
FIG. 3 shows a scanning electron microscope (SEM) image of the nanocomposite material, according to certain embodiments.

FIG. 3 presents the scanning electron microscope (SEM) image of the synthesized nanocomposite, revealing the morphological characteristics and surface structure. The SEM image shows a rough and heterogeneous surface, with irregularly shaped clusters distributed across the composite. Certain clusters appear as large multi-layered, flaky plates, which could be attributed to layered structures formed during synthesis. These clusters are accompanied by finer granular particles of which a substantial fraction adhere to the larger flakes. This rough and layered morphology, combined with fine granules, indicates a high surface area, which may enhance the composite's reactivity in applications involving adsorption or catalysis. The distinct shapes observed in the SEM image, including flake-like and granular forms, are characteristic of materials synthesized with complex compositions, further emphasizing the composite's structural diversity.

Figure 4:
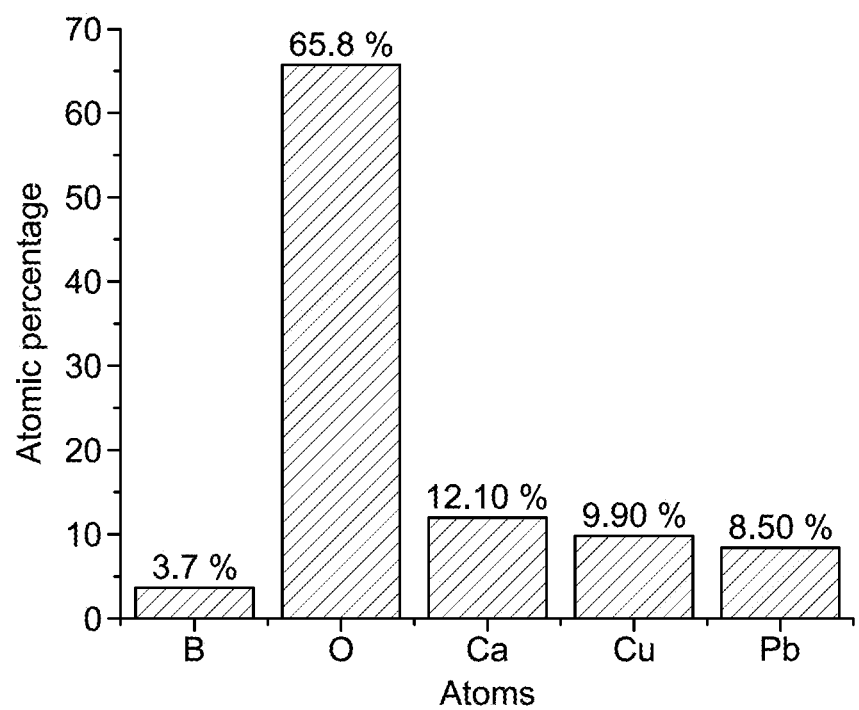
FIG. 4 is a graph illustrating the atomic percentage distribution of elements in the nanocomposite material, as determined by Energy-dispersive X-ray spectroscopic (EDX) analysis, according to certain embodiments.

Energy-dispersive X-ray spectroscopy (EDX)—the results of which are depicted in FIG. 4—confirmed that the synthesized nanocomposite material composed of B, O, Ca, Cu, and Pb had atomic percentages of 3.70, 65.80, 12.10, 9.90, and 8.50 atom %, respectively, based on the total number of atoms in the nanocomposite material.

The $CaB_2O_4/PbO/CuO/Pb_3O_4/PbB_2O_4/Pb_4O(BO_3)_2$ nanocomposite holds promise for commercial applications in water treatment, where its multi-phased composition can facilitate the efficient adsorption and removal of inorganic and organic contaminants. It may also have utility in catalysis through leveraging its unique morphology and composition to enhance catalytic reactions in chemical processing. Additionally, its structural properties make it an ideal candidate for use in electronic materials, where stable and complex composites are required for advanced device fabrication.

The present disclosure presents a $CaB_2O_4/PbO/CuO/Pb_3O_4/PbB_2O_4/Pb_4O(BO_3)_2$ nanocomposite synthesized through the Pechini sol-gel method. This technique enables precise control over the synthesis process to achieve a multi-phased material with distinct morphological features. The X-ray diffraction (XRD) analysis confirmed the composite's unique multi-phase composition, including calcium borate, lead oxide, copper oxide, lead tetroxide, lead borate, and lead oxide borate phases, with an average crystallite size of 56.73 nm, indicating a well-defined crystalline structure. The scanning electron microscope (SEM) images revealed a rough and heterogeneous surface with irregularly shaped clusters, including large flake-like plates and finer granular particles, indicative of layered structures and multi-phase characteristics formed during synthesis. This novel nanocomposite stands out for its structural diversity and stability, characteristics that enhance its potential for advanced applications, particularly in fields requiring materials with complex compositions and robust performance.

Numerous modifications and variations of the present disclosure are possible in light of the above teachings. It is, therefore, to be understood that within the scope of the appended claims, the invention may be practiced otherwise than as specifically described herein.

The invention claimed is:

1. A multiphase particulate nanocomposite material comprising, as determined by X-ray diffraction:
    a monoclinic CuO crystalline phase;
    an orthorhombic $CaB_2O_4$ crystalline phase;
    an orthorhombic PbO crystalline phase;
    an orthorhombic $Pb_4O(BO_3)_2$ crystalline phase;
    a tetragonal $Pb_3O_4$ crystalline phase; and,
    a $PbB_2O_4$ crystalline phase,
wherein, based on the total number of atoms in the nanocomposite material:
    an atomic concentration of boron (B) is from about 1 to about 10 atom %;
    an atomic concentration of calcium (Ca) is from about 5 to about 15 atom %;
    an atomic concentration of copper (Cu) is from about 5 to about 15 atom %; and,
    an atomic concentration of lead (Pb) is from about 5 to about 15 atom %.

2. The particulate nanocomposite material according to claim 1 having a volume average crystallite size, as determined by X-ray diffraction, of from about 55 to about 60 nm.

3. The particulate nanocomposite material according to claim 1 having a volume average crystallite size, as determined by X-ray diffraction, of from about 56 to about 58 nm.

4. The particulate nanocomposite material according to claim 1, wherein the nanocomposite material is in the form of particles having a matrix phase with a rough surface and in which sharp-edged plates are embedded and protrude.

5. The particulate nanocomposite material according to claim 4, wherein at least a fraction of the sharp-edged plates have a multilayered structure.

6. The particulate nanocomposite material according to claim 4, wherein the sharp edged plates have a median volume particle size (Dv50) of from about 5 to about 30 μm, as determined by Scanning Electron Microscopy.

7. The particulate nanocomposite material according to claim 4, wherein the sharp edged plates have a Dv90 particle diameter of less than about 50 μm, as determined by Scanning Electron Microscopy.

8. The particulate nanocomposite material according to claim 4 further comprising granular particles having a median volume particle size (Dv50) of from about 0.1 to about 10 μm, as determined by Scanning Electron Microscopy.

9. A method for preparing the multiphase particulate nanocomposite material as defined in claim 1, the method comprising:
    forming an aqueous mixture by adding an aqueous solution of a chelating agent to an aqueous solution of a calcium salt, a copper salt, a lead salt and boric acid;
    adding a polyol into the aqueous mixture to form a gel;
    heating the gel under stirring at a temperature of from about 200 to about 400° C. for a sufficient duration to form a dry powder; and,
    calcining the dry powder at a temperature of from about 500 to about 800° C. to form the nanocomposite material.

10. The method according to claim 9, wherein the aqueous solution of the chelating agent is added in a dropwise manner into the aqueous solution of the calcium salt, the copper salt, the lead salt and boric acid.

11. The method according to claim 9, wherein:
the calcium salt is selected from the group consisting of calcium sulfate ($CaSO_4$), calcium nitrate ($Ca(NO_3)_2$), calcium chloride ($CaCl_2$) and calcium acetate ($Ca(CH_3COO)_2$);
the copper salt is selected from the group consisting of copper sulfate ($CuSO_4$), copper nitrate ($Cu(NO_3)_2$), copper chloride ($CuCl_2$) and copper acetate ($Cu(CH_3COO)_2$); and,
the lead salt is selected from the group consisting of lead sulfate ($PbSO_4$), lead nitrate ($Pb(NO_3)_2$), lead chloride ($PbCl_2$) and lead acetate ($Pb(CH_3COO)_2$).

12. The method according to claim 9, wherein:
the calcium salt is calcium nitrate ($Ca(NO_3)_2$);
the cobalt salt is copper nitrate ($Cu(NO_3)_2$); and,
the lead salt is lead nitrate ($Pb(NO_3)_2$).

13. The method according to claim 9, wherein the chelating agent comprises at least one hydroxyalkyl carboxylic acid selected from the group consisting of citric acid, tartaric acid, malic acid, mandelic acid and 12-hydroxystearic acid.

14. The method according to claim 9, wherein the chelating agent consists of tartaric acid.

15. The method according to claim 9, wherein the polyol is added in a dropwise manner into the aqueous mixture.

16. The method according to claim 9, wherein the polyol has a number average molecular weight of from about 200 to about 5000 g/mol. and an hydroxyl number of from about 25 to about 500 mg KOH/g.

17. The method according to claim 9, wherein the polyol is selected from the group consisting of: polyester polyols; polyether polyols; poly(ether-ester) polyols; poly(alkylene carbonate) polyols; and, mixtures thereof.

18. The method according to claim 9, wherein the polyol comprises a polyoxy($C_2$-$C_3$)alkylene polyol.

19. The method according to claim 18, wherein the polyol comprises a polyoxy($C_2$-$C_3$)alkylene polyol having a number average molecular weight of from about 200 to about 5000 g/mol. and an hydroxyl number of from about 25 to about 500 mg KOH/g.

20. A method of immobilizing inorganic contaminants disposed in an aqueous medium, the method comprising contacting the aqueous medium with the multiphase particulate nanocomposite material as defined in claim 1.

* * * * *